Dec. 8, 1953    R. R. DONALDSON, JR    2,661,754
PRESSURE DIFFERENTIAL RESPONSIVE DEVICE
Filed Aug. 9, 1949    3 Sheets-Sheet 1

INVENTOR.
ROBERT R. DONALDSON, JR.
BY
Zugelter & Zugelter
Attys.

Dec. 8, 1953 R. R. DONALDSON, JR 2,661,754
PRESSURE DIFFERENTIAL RESPONSIVE DEVICE
Filed Aug. 9, 1949 3 Sheets-Sheet 3

INVENTOR.
ROBERT R. DONALDSON, JR.
BY Zugelter & Zugelter
Attys.

Patented Dec. 8, 1953

2,661,754

UNITED STATES PATENT OFFICE 2,661,754

PRESSURE DIFFERENTIAL RESPONSIVE DEVICE

Robert R. Donaldson, Jr., Forest Hills, Pa., assignor to Hagan Corporation, Pittsburgh, Pa., a corporation of Pennsylvania Application August 9, 1949, Serial No. 109,324

4 Claims. (Cl. 137—86)

1

This invention relates to pressure differential responsive devices and more particularly to devices of the type embodying a hollow ring containing a heavy liquid and a partition which with the liquid forms two pressure chambers in which the differential pressure acts to develop a turning torque or force on the ring, and pressure developing and balancing means operatively connected to the ring. The pressure developed is utilized to hold the ring in a substantially fixed or null position by balancing the differential turning force applied to the ring throughout the range of pressure differential to which the device responds. Since the motion of the ring is nil, and only the heavy liquid within the ring moves, there being substantially no friction between the liquid and the ring, the device is substantially frictionless.

An object of this invention is to provide a ring type pressure differential responsive device having a fluid pressure sending device and a balancer responsive to the value of the pressure developed by the sending device for restraining the ring to a substantially fixed or null position throughout the operating range of the ring.

A further object of the invention is to provide a device of the character referred to above, in which there is only sufficient angular motion of the ring to actuate a fluid pressure sending valve or other device, turning of the ring being opposed by a balancer whose balancing and opposing force is a function of the fluid pressure developed and proportional to the value of the pressure differential acting on the ring, the balancer causing the ring to remain substantially fixed in position.

Another object of the invention is to provide a balancer for a ring pressure differential device that is arranged to develop a control pressure and a balancing force both of which are proportional to the square or other root of the differential acting on the ring.

And a still further object of the invention is to provide a device of the character referred to above, having a force developing device, such as a valve, actuated by the ring and an automatic balancer and automatic reset responsive to the control pressure or force developed by said valve, whereby the device may be utilized as a regulator, the ring of the device having only slight angular movement at any time and a null position at balance.

These and other objects of the invention will, in part, be apparent and, will, in part, be obvious from the following specification and drawings in which:

2

Fig. 6 is a modified form of the device shown in Fig. 5;

Figures 1, 2:
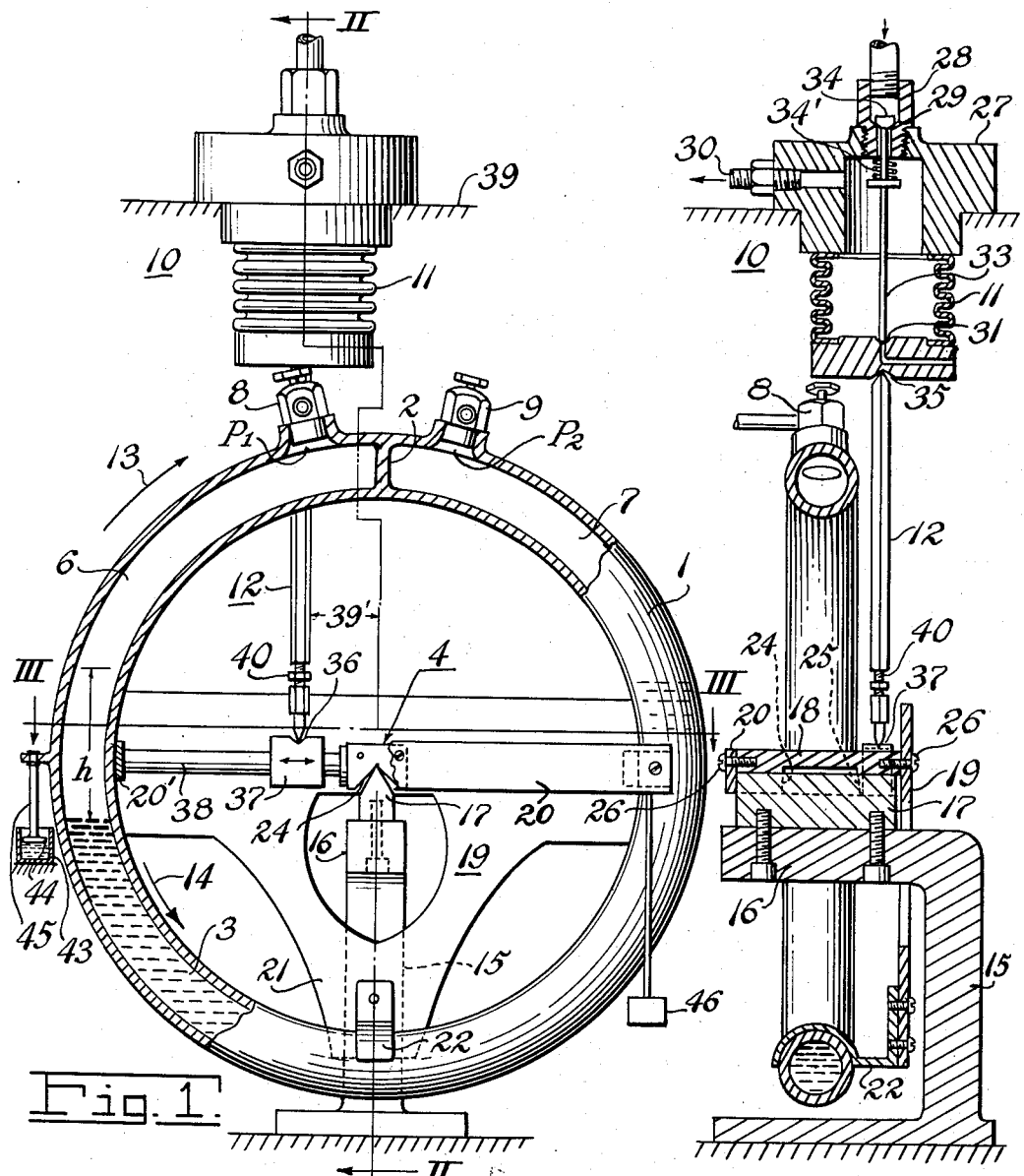
Figure 1 is a view in front elevation of a pressure differential ring device embodying a from of the invention, and arranged to develop pressures and balancing forces whose magnitudes are proportional to the pressure differential acting on the ring.
Figs. 2 and 3 are views in section, taken on lines II—II and III—III, respectively, of Fig. 1.

Fig. 7 is a more or less diagrammatic view of a regulator embodying a pressure differential responsive ring and an automatic reset arranged and constructed in accordance with the invention; and Fig. 8 is a modified form of the regulator shown in Fig. 7 as applied to the regulation of the flow of fluid in a duct, conduit, or pipe line, to maintain a substantially constant differential across an orifice therein.

Throughout the drawings and the specification like reference characters indicate like parts.

In each of the several forms of the invention, a hollow ring or toroid 1 is provided having therein a partition 2 and a quantity of a heavy liquid 3, such as mercury. The ring is mounted at its center on a frictionless bearing 4. When so mounted and the ring is free of restraint or externally applied forces, it assumes a position such as indicated in Fig. 1. In this position the partition 2 is above the bearing 4 and in a vertical plane passing through the bearing of the ring and the liquid 3 assumes a horizontal level. The quantity of liquid employed is such as to form with the partition 2 pressure receiving chambers 6 and 7 that are sealed from each other by the liquid. To these chambers unequal pressures, such as the pressure differential across an orifice, may be applied, the pressure being admitted to the chambers through inlet fittings 8 and 9, respectively.

The device shown in Fig. 1 includes a fluid or pneumatic balancer and valve assembly 10 having a flexible member or wall 11 that acts through a compression link 12 on the ring at a point removed from the center of bearing 4. The valve of assembly 10 is actuated by the ring in response to angular movement thereof about its bearing when there is a difference between the pressures applied to chambers 6 and 7, to establish a pressure that acts on the flexible member 11. The force of this pressure acts through the compression link 12 on the ring in opposition to the turning force of the pressure differential acting on the ring.

If it be assumed that pressures $P_1$ and $P_2$ act in chambers 6 and 7, respectively, and that $P_1$ is greater than $P_2$, ring 1 will tend to turn in the direction indicated by arrow 13, the turning force applied being proportional to $(P_1-P_2)$. In response to this angular ring motion, the valve of assembly 10 is actuated to increase the pressure acting on member 11 until the force exerted thereby on the ring balances the turning force of the pressure differential acting on the ring, at which time the ring is returned to its initial position. The liquid in the ring will be displaced in the direction of arrow 14 until the difference "$h$" between the levels is in balance with the pressure difference $(P_1-P_2)$. The pressure difference $(P_1-P_2)$ multiplied by the area of partition 2 is proportional to the turning torque or force acting on the ring and this turning torque is balanced by balancer 10. Except for the slight angular movement above mentioned, the ring remains in its initial position throughout the range of operation of the device and only the liquid in the ring moves. Thus the device may be regarded as one having a null-position pressure differential responsive element in which mechanical friction is so light as to be imperceptible for all practical purposes.

Figure 3:
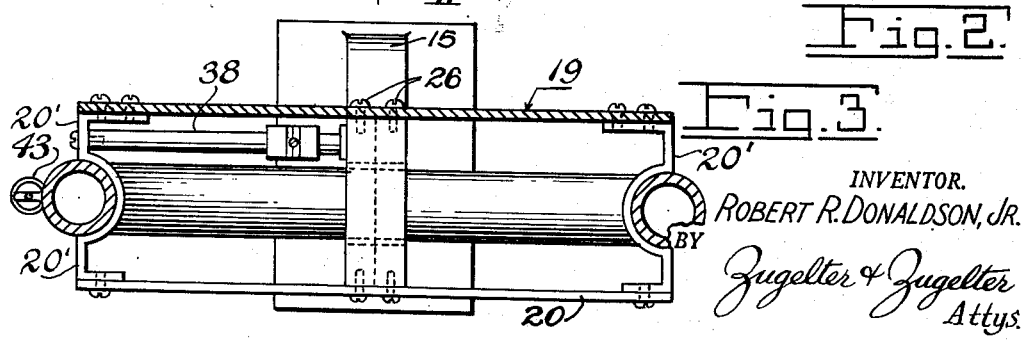
Figure 4:
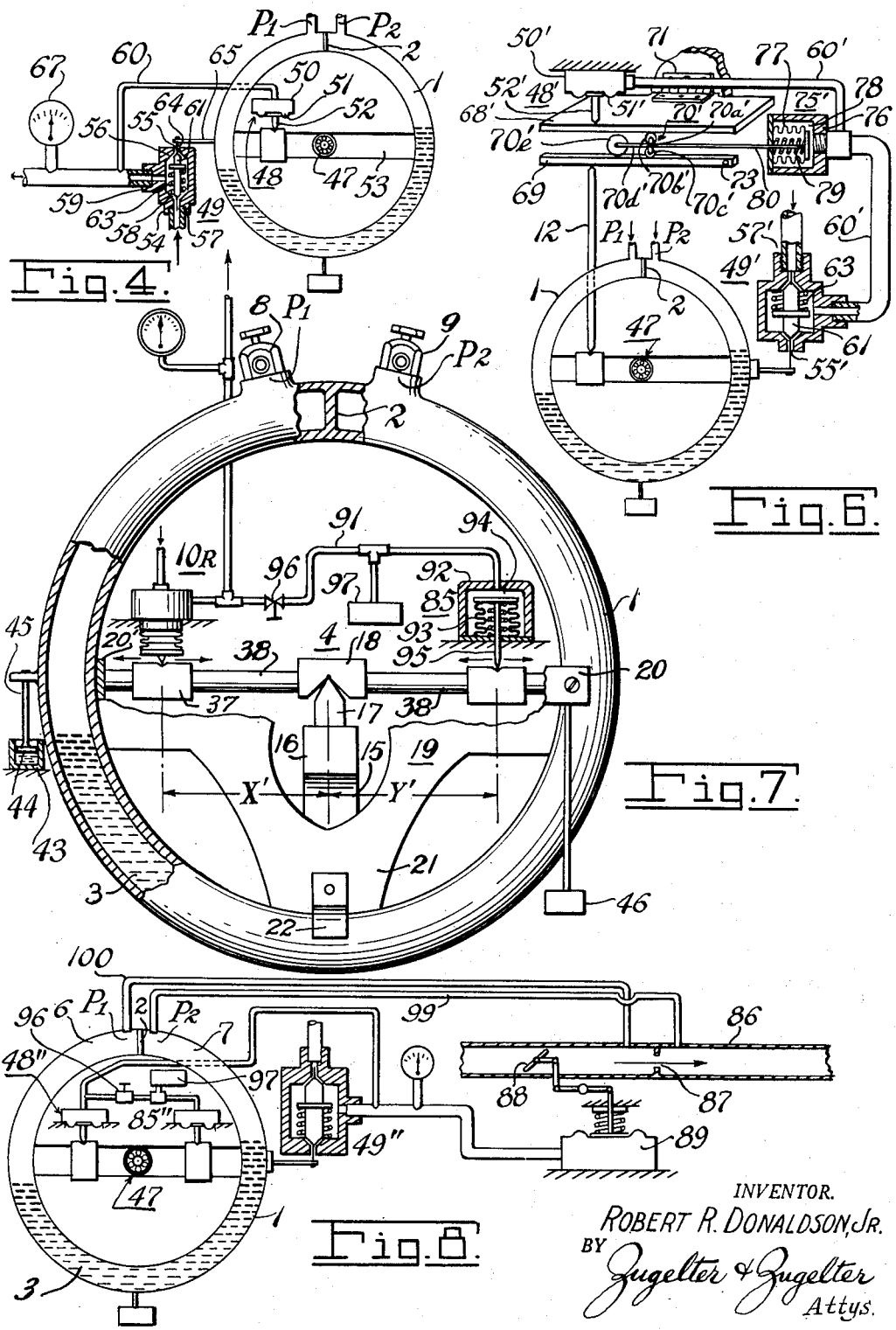
Fig. 4 is a view in front elevation of a modified form of the device shown in Figs. 1 to 3 inclusive.

Bearing 4 may be of the knife edge type as shown in Figs. 1 to 3, 5 and 7, or it may be of the ball-bearing or other anti-friction, type as shown in Figs. 4, 6 and 8. The bearing illustrated in Figs. 1 to 3 is carried by a support pedestal 15 disposed behind the ring and having a forwardly projecting arm 16 on which a knife edge 17 of the bearing is mounted. A complementary part 18 of the bearing is carried by a pair of spaced members 19 and 20 extending across the diameter of the ring. Member 19 is secured at its ends to brackets 20' attached to the ring at diametrically opposite sides thereof. Member 19 may be, as shown, of generally T shape. The ends of the cross bar of the T are secured to brackets 20' and the bottom of the vertical leg 21 thereof is secured to a bracket 22 secured to the ring.

Bearing part 18 comprises a rigid member having inverted V-shaped notches or ways 24 and 25 at the opposite ends thereof which seat on the edge of the knife edge 17. The line of contact between the bearing members 17 and 18 is at the center of ring 1. Member 18, as shown, is secured at its opposite ends to members 19 and 20 by screws 26 or other suitable means.

The valve and balancer assembly 10 comprises a body 27 having an inlet port fitting 28 provided with a valve seat 29, an outlet or sending port 30 and an exhaust port 31 formed in the flexible member 11. Flexible member 11 is shown as a bellows which is secured to the bottom of body 27 to close the same. In other words, the interiors of the body and the bellows are in communication and, together, form a pressure chamber. The exhaust port 31 is formed in the bottom of bellows 11 through which the interior of the housing and bellows may be exhausted to atmosphere via a lateral passageway 32. A valve stem 33 within the housing has a valve element 34 at its upper end disposed to seat on the inlet port seat 29. The lower end of stem 33 extends into the exhaust port seat 31. A light compression spring 34' may be employed to urge the valve stem in a direction to close the inlet port. When the device is in use, a source of fluid pressure, such as compressed air at constant pressure, is applied to the inlet fitting 28.

The bottom of bellows 11 is provided with an inverted conical bearing 35 to accommodate the upper end of compression link 12. The lower end of compression link 12 is seated in a conically shaped bearing 36 formed in a bearing block 37. Block 37 is mounted on a bar 38 and is adjustable towards or away from bearing 4 to shorten or lengthen the radius arm 39' at which the force of bellows 11 is applied to ring 1. Bar 38 is secured at one end to bearing member 18 and at the other to one of brackets 20.

In order that the line of action of link 12 may always be vertical for every position of block 37, the valve and balancer assembly 10 is also adjustably attached to its support or mounting 39. In order that the length of link 12 may be adjusted, a screw extension 40 is provided. By means of this adjustment, an initial loading may be imposed on ring 1 and bellows 12, if desired, or if undesirable slack exists between bearings 35 and 36 and the link, it may be taken up by adjusting extension 40 to the length of the link.

Valves of the type embodied in the assembly 10 have a tendency to vibrate because of a chattering that develops between the valve stem and the inlet and exhaust seats. This vibration may occur only when certain values of pressures occur within the body and bellows, however, it is objectionable and should be prevented. These vibrations may be damped out by means of a dash pot in the form of a cup 43 having therein a liquid such as oil and a loosely fitting piston 44 connected to ring 1 by a link 45.

Ring 1 may be provided with a counter weight 46 tending to urge the ring in a clockwise direction as seen in the drawings with a force sufficient to balance the spring of bellows 11 and the dead weight of link 12 and other parts having a tendency to turn the ring counter-clockwise. If it be assumed that the pressures $P_1$ and $P_2$ are equal and that the ring is in its null or neutral position when $P_1$ and $P_2$ are equal, then valve stem 33 will seat on both the inlet port and exhaust port seats, closing them. When the valve seats are both closed, the valve is in neutral position.

If it be assumed that pressure $P_1$ is increasing with respect to $P_2$, and a differential $(P_1-P_2)$ is thereby established, the liquid in the ring will be displaced counter-clockwise until the difference in level between the opposite ends of the liquid body balances $(P_1-P_2)$. This differential also acts on partition 2 in a direction tending to turn the ring in the direction of arrow 13. When the ring moves slightly in this direction an upward force is transmitted through link 12 to bellows 11 whereby it is compressed, valve element 34 is lifted off seat 29 and fluid under pressure enters the housing chamber and acts on the bellows. As the pressure increases in the bellows, the increasing force developed is transmitted through link 12 to the ring. When the pressure in the bellows has increased to a value at which the force exerted by it on ring 1 is equal and opposite to the force of the differential $(P_1-P_2)$ acting on partition 2 and the liquid 3, the bellows will have expanded to its original or initial position and returned the valve to its neutral position. The ring also will have been returned to its initial position. As the differential $(P_1-P_2)$ continues to increase, the valve is opened until the pressure in the bellows has increased sufficiently to develop the force required to balance the differential pressure turning force acting on the ring.

If the differential decreases, the force exerted by bellows 11 on ring 1 will exceed the force of the pressure differential $(P_1-P_2)$ and shift ring 1 in a direction opposite that indicated by arrow 13, whereby the exhaust port 31 is uncovered and the pressure in bellows 11 is decreased to a value at which the forces exerted by the bellows and the differential $(P_1-P_2)$ are again in balance, at which time the valve and ring will be in their neutral positions. Thus, for every value of differential $(P_1-P_2)$ a definite value of pressure will be established in the balancer 10. This balancing pressure is a function of $(P_1-P_2)$ and may be impressed on an indicating gage 67, transmitted to a recording mechanism at some remote point, and utilized for various purposes, including control and regulation.

In Fig. 4 ring 1 is shown mounted on an antifriction bearing such as a ball bearing 47, and provided with a balancer 48 and a valve 49, the balancer and valve being separate elements instead of a combined or unit assembly as in Figs. 1 to 3. The balancer comprises a stationary housing 50 closed on its lower side by means of a flexible wall such as a diaphragm 51. The diaphragm is provided with a push rod 52 that acts on a member 53 extending across the diameter of the ring and being secured at its opposite ends to the ring.

Valve 49 comprises a body 54 having an exhaust port 55 provided with a seat 56, an inlet port 57 provided with a seat 58, and an outlet port 59 connected to the interior of housing 50 by a pipe 60. A source of supply of fluid pressure such as compressed air at a constant pressure at a value of say, 60 p. s. i. g. may be connected to the inlet port 57. Within the valve body is a valve 61 having conically shaped ends disposed to seat on one or the other of the inlet and exhaust port seats, when in one or the other of its extreme positions. When valve 61 is in some position intermediate said seats 56 and 58 the inlet and exhaust ports are throttled more or less so that the pressure at the outlet 59 will vary between atmospheric, as when the inlet port is closed, to the value of the supply source, as when the exhaust port is closed and the inlet port is open. The intermediate values of pressure vary with the relative closeness of the ends of the valve element 61 to the respective inlet and exhaust port seats.

As shown in Fig. 4, valve element 61 is urged towards the exhaust seat 56 by a spring 63. A stem 64 on the valve extends upwardly through this seat 56 and engages a finger 65 on ring 1 whereby valve element 61 is actuated.

The amount of travel of valve element 61 between the closed inlet and closed exhaust port positions is small, being of the order of a hundredth (.01) of an inch; therefore, the amount of angular movement of the ring 1 required to actuate valve from the center of the ring is small.

If the differential $(P_1-P_2)$ is zero, valve 61 may be assumed to be in the position in which the inlet port 57 is closed, in which case the pressure in the balancer housing 50 will be atmospheric. As $P_2$ increases with respect to $P_1$, the inlet port is gradually opened and the outlet port 59 gradually and correspondingly closed. As the differential $(P_1-P_2)$ increases, the pressure delivered by valve 49 to housing 50 increases, consequently diaphragm 51 will exert a balancing force on the ring and restrain its angular motion beyond the amount necessary to actuate valve 49 the amount necessary to establish a pressure in housing 50 balancing the turning force of the differential $(P_1-P_2)$ on the ring. For every value of differential $(P_1-P_2)$ there will be a definite value of balancing pressure sent out by valve 49. The value of this pressure is proportioned to $(P_1-P_2)$ and may be indicated on a gage 67 or transmitted to a remote point for indicating or regulating purposes or both. If the pressure differential $(P_1-P_2)$ decreases from a balanced value, the force exerted by diaphragm 51 will turn the ring slightly in the opposite direction whereby the valve is actuated to reduce the pressure in the housing until there is a balance between the forces exerted by diaphragm 51 and the differential $(P_1-P_2)$ on the ring.

The devices shown in Figs. 1 to 4 inclusive develop balancing pressures that are proportional to $(P_1-P_2)$. If the differential is that developed across an orifice in a conduit through which a gas or fluid flows, the balancing pressures applied to the balancing devices are not linearly proportional to the flow as $(P_1-P_2)$ is proportional to the square of the flow. Therefore, to translate these pressures into values which are linearly proportional to the rate of flow, it is necessary to extract the square root of the values and multiply them by the proper constant.

Figure 5:
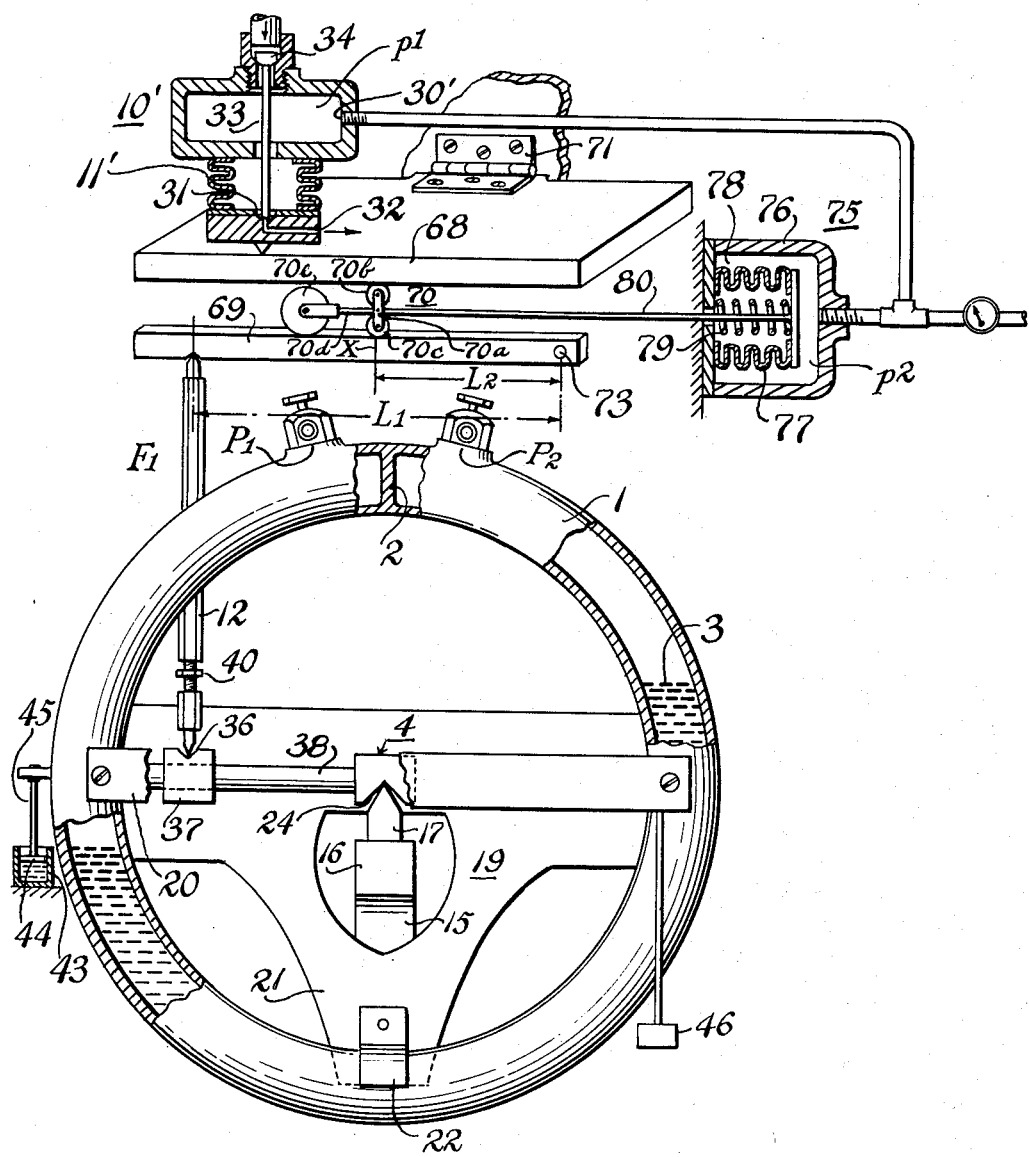
Fig. 5 is a more or less diagrammatic view of a device such as shown in Figs. 1 to 3 but modified to develop a pressure and a balancing force whose magnitudes are proportional to the square root of the pressure differential acting on the ring.

In Figs. 5 and 6 I have shown modifications of the devices illustrated in Figs. 1 to 4 inclusive whereby the pressure applied to the balancers are linearly proportional to flow. In other words, the modified arrangements extract the square root of the differential $(P_1-P_2)$ applied to ring 1.

In Fig. 5, a balancer and valve assembly 10' similar to the assembly 10 of Figs. 1 to 3, acts on ring 1 through spaced levers 68 and 69 and a movable bearing or spacer 70, and the compression link 72, to balance the turning force exerted on the ring by the differential $(P_1-P_2)$. Lever 68 extends laterally or at right angles to lever 69 and is pivotally supported at or near its rear edge by a hinge 71. By this arrangement lever 68 is hinged at right angles to lever 69 so that the force exerted by bellows 11' on spacer 70 is independent of the point where bellows 11' acts on lever 68 and for any value of pressure in the bellows the force will be the same at all locations with respect to spacer or bearing 70. Lever 69 is pivotally supported at 73 at a point on the opposite side of assembly 10' with respect to the pivotal support 71. Bearing 70 is engaged by levers 68 and 69 at a point between the pivotal supports 71 and 73. Bearing 70 is shifted to various positions between the pivotal supports 71 and 73 by a pressure actuated device 75. The particular point to which bearing 70 is actuated is proportional to the pressure transmitted from the sending port 30' of the assembly 10'.

Spacer 70 comprises a strut 70a having wheels 70b and 70c mounted at the top and bottom thereof to be engaged by levers 68 and 69, respectively. Strut 70a is connected to link 80. Link 80 has an extension 70d projecting to the left of strut 70a the free end of which is supported on small wheel 70e. Wheel 70e rides only on lever 69, is spaced from the upper lever 68 as shown, and provides steadiness and stability to the mechanism as it is moved to and fro between the levers 68 and 69.

Device 75 may comprise a housing 76 having therein a bellows 77 which is closed at its inner end. The outer end of the bellows is secured to the housing to form a pressure tight chamber 78 therein. A compression spring 79 is provided to resist compression of the bellows, and the bellows is connected by a link 80 to strut 70a of the bearing 70.

The characteristic of spring 79 is such that the bellows will actuate bearing 70 to a definite but different position for each value of pressure applied to the housing chamber 78. Thus, for example, if it be assumed that when the pressure in chamber 78 is zero gage, bearing 70 is in the position indicated at X and that when the maximum pressure is transmitted to the chamber by device 70', the bearing is moved to position y, it follows that for every intermediate value of pressure the bearing will occupy some definite intermediate position corresponding to such pressure.

In Fig. 5, forces and lever arms are designated as follows:

$F_1$ is the force or thrust exerted by ring 1 through link 12 upwardly on lever 69.

$F_1 = K(P_1 - P_2)$ where K is a constant. Rate of flow RF, producing $K(P_1-P_2)$ is equal to $\sqrt{K(P_2-P_2)}$ $P_1$ (assuming unit area of bellows 11') is the force exerted by bellows 11' on lever 68.

$P_2$ (assuming unit area of bellows 77) is the positioning pressure for bearing 70 and is equal to $P_1$.

$L_1$ is the length of the lever arm between the point of action of link 12 on lever 69 and the pivotal support 73.

$L_2$ is the length of the lever arm between the point of action of bearing 70 on lever 69 and the pivotal support 73.

From the above, the following equations may be written:

$$F_1 L_1 = K P_1 L_2$$
$$L_2 = K_1 P_2$$
$$F_1 L_1 = K K_1 P_2 P_1$$
$$F_1 = \frac{K K_1 P_2 P_1}{L_1}$$

Since $$P_1 = P_2$$
$$F_1 = \frac{K K_1}{L} P_1^2 = K' P_1^2$$

where $$\frac{K K_1}{L} = K'$$

$$P_1 = \sqrt{\frac{F'}{K'}} = C\sqrt{F_1}$$

Since $F_1$ is proportional to the square of the rate of flow $P_1$ is linearly proportional to the flow that produces $(P_1 - P_2)$.

In Fig. 6 a modified form of the arrangement shown in Fig. 5 is illustrated. In this modification a balancer 48' similar to balancer 48, and a valve 49' such as valve 49 of Fig. 4, are employed. The reference characters applied to the individual parts of the balancer corresponding to similar parts of balancer 48 are indicated by the same numerals with primes affixed. Also, ring 1 is mounted on a ball bearing 47 instead of a knife edge bearing. Slight angular movement of ring 1 actuates valve 49' whereby pressures are sent to the balancer 48' and the shifter 75' for bearing 70. The pressure established in pipe 68' is a function of the square root of the differential $(P_1 - P_2)$, the equations given above in connection with Fig. 5 being applicable.

In Fig. 7, a balancer 10R such as the combined balancer-and-valve 10 of Figs. 1 to 3, and an automatic reset 85 are shown operatively connected to ring 1 so that the device may be utilized as a regulator having an automatic reset. When so used, the ring would be connected across an orifice in a pipe line through which a fluid, gas or liquid flows, as shown in Fig. 8, the pipe or conduit and orifice being indicated by numerals 86 and 87, respectively. Flow through the conduit is controlled by a damper or valve 88 actuated by a regulator 89 responsive to the control pressure sent out by balancer 10R. The automatic reset feature 85 operates to cause ring 1 to be in balance only when the differential $(P_1 - P_2)$ across the orifice is at the control point value for which the regulator is initially set.

As shown in Fig. 7, the balancer 10R acts on ring 1 to oppose the turning force developed on the ring by the pressure differential $(P_1 - P_2)$. The pressure at the sending port of the balancer is sent to the regulator to be actuated and through a pipe 91 to the automatic reset 85.

Automatic reset 85 comprises a housing 92 having therein a flexible member such as a bellows 93 which is closed at its upper end and sealed at its lower end to the diaphragm housing thereby providing a pressure chamber 94. The bellows 93 acts through a push rod 95 on ring 1 on the side opposite bearing 4 with respect to which the balancer 10R acts on the ring. A needle valve 96 is provided in the connecting pipe 91 and may be adjusted in accordance with the rate at which it is desired pressures shall build up or change in housing 92 with respect to the pressure developed in the balancer 10R. A volume chamber or tank 97 may be connected to pipe 91 at a point between needle valve 96 and housing 92 to give stability and certain desirable operating characteristics to the regulating device.

As is evident by inspection of Fig. 7, the force exerted by the balancer 10R on the ring 1 opposes the turning force of the pressure differential $(P_1 - P_2)$ acting on the pressure chambers within the ring, and that the force exerted by the push rod 95 of the reset 85 acts in the same direction as the turning force developed by the pressure differential $(P_1 - P_2)$.

By adjusting the distances $x'$ and $y'$ at which the respective balancer 10R and automatic reset 85 act on ring 1 with respect to the center of bearing 4, it will be apparent that the regulator can be preset or pre-adjusted to maintain a given differential $(P_1 - P_2)$ across an orifice in a pipe line such as indicated in Fig. 8. If the differential increases above this preset value, the ring will turn clockwise as seen in Fig. 7, whereby the pressure developed in balancer 10R is increased tending to restrain turning rotation of the ring; however, this pressure gradually is transferred to and builds up in the automatic reset 85, which, as stated above, acts on the ring in the same direction as the force of the pressure differential $(P_1 - P_2)$. Therefore, the valve balancer 10R will remain open and cause the pressure to build up even to maximum value until the regulator, such as regulator 89, has adjusted the position of damper 88 sufficiently to bring the differential $(P_1 - P_2)$ back to the preset value. As the differential $(P_1 - P_2)$ approaches the preset value, the pressures in the automatic reset 85 and in the balancer 10R will approach equality and balance. When the pressure ($P_1-P_2$) has been restored to the preset value, the ring will be in equilibrium with that pressure differential and the opposing forces exerted by the automatic reset and the balancer will be equalized. The volume chamber 97 acts to give stability to the automatic reset feature and with the needle valve, depending upon its adjustment, controls the rate of response of the automatic reset to a departure of the pressure differential ($P_1-P_2$) from the preset value.

As indicated in Fig. 7, the balancer unit 10R and automatic reset 85 may be adjusted towards or away from the bearing 4 to adjust the device to the particular operating conditions encountered in any particular installation.

In Fig. 8 there is illustrated a pressure regulator having an automatic reset, such as shown in Fig. 7, but which is modified in these particulars: ring 1 is mounted at its center on a ball bearing 47 or other anti-friction bearing other than a knife edge, and the balancer is like the balancer 48 in Fig. 4, the balancer in Fig. 8 being designated by numeral 48". An escapement valve 49" is actuated by the ring and transmits its pressure to the balancer 48" and to the automatic reset 85" and volume chamber. As shown, ring 1 is connected across the orifice 87 by pipe connections 99 and 100, so that $P_1$ and $P_2$ act in chambers 6 and 7, respectively, of the ring. The valve 49" is actuated by ring 1 in the manner described in connection with Figs. 4 and 6, and the balancer 48" and automatic reset 85" operate in the same manner as the balancer and automatic reset of Fig. 7 operate.

Having thus described the invention, it will be apparent to those skilled in this art, that various modifications and changes may be made therein without departing either from the spirit or the scope of the invention. Therefore, what I claim as new and desire to secure by Letters Patent is:

1. A device for developing fluid pressures that vary in magnitude as a function of a pressure differential comprising a hollow ring mounted on a substantially frictionless bearing at the center thereof, said ring having a partition therein located at a point above the bearing and a quantity of heavy liquid in the portion of the ring below said bearing which, together with the partition, form two chambers that are sealed from each other by said liquid, a valve disposed to be actuated by said ring in response to angular movement thereof on its bearing resulting from unequal pressures being applied to said chambers, said valve developing a fluid pressure at its outlet whose magnitude varies with the angular displacement of said ring, a balancer comprising a pair of parallel levers, each lever having a single pivotal support, said pivotal supports being spaced from each other in a direction lengthwise of the levers, a bearing between said levers and between said pivots whereby motion is transmitted from one lever to the other, a housing having a pressure chamber and a flexible diaphragm closing one side thereof and bearing on one of said levers, a thrust link between said ring and said other lever for transmitting a force from said ring to said levers, said valve being actuated by said levers in response to movement of said ring for establishing a pressure in said housing, and a chambered member having a diaphragm subjected to the pressure transmitted to the chamber of said housing by said valve and connected to the bearing between said levers for shifting the same between said pivots to positions corresponding to the value of pressure transmitted by said valve, whereby the pressure developed by said valve and acting on said ring through said levers and thrust link in opposition to the force exerted by the pressure differential on said ring is caused to vary as the square root of the pressure differential acting on said ring.

2. A device for developing fluid pressures that vary in magnitude as a function of a pressure differential comprising a hollow ring mounted on a substantially frictionless bearing at the center thereof, said ring having a partition therein located at a point above the bearing and a quantity of heavy liquid in the portion of the ring below said bearing which, together with the partition, form two chambers that are sealed from each other by said liquid, a valve disposed to be actuated by said ring in response to angular movement thereof on its bearing resulting from unequal pressures being applied to said chambers, said valve developing a fluid pressure at its outlet whose magnitude varies with the angular displacement of said ring, a balancer comprising a pair of parallel levers, each lever having a single pivotal support, said pivotal supports being spaced from each other in a direction lengthwise of the levers, a bearing between said levers and between said pivots whereby motion is transmitted from one lever to the other, a housing having a pressure chamber and a flexible diaphragm closing one side thereof bearing on one of said levers, a force transmitting link between said ring and said other lever for transmitting a force from said ring to said levers, said valve being actuated by said levers in response to movement of said ring for establishing a pressure in said housing, and a chambered member having a diaphragm subjected to the pressure transmitted to the chamber of said members by said valve and connected to the bearing between said levers for shifting the same between said pivots to positions corresponding to the value of pressure transmitted by said valve, whereby the pressure developed by said valve and and acting on said ring through said levers and said force transmitting link in opposition to the force exerted by the pressure differential on said ring is caused to vary as the square root of the pressure differential acting on said ring.

3. A pressure actuated device comprising a hollow ring of constant mean radius and having a fixed partition therein and a quantity of heavy liquid which with the partition, divides the interior of the ring into separate chambers adapted to receive pressures of differing values, and a balancer comprising a housing having a flexible wall, a valve actuated by said flexible wall for establishing a pressure in said housing whose magnitude is a function of the force developed by the difference between the pressures in said ring chambers, a compression link connected to said ring at a point removed from the center thereof, a pair of spaced levers interposed between said link and the flexible wall of said housing, each of said levers having a pivotal support so located that they are spaced from each other in a direction lengthwise of the levers, a spacer between said levers and the pivotal supports thereof for transmitting forces between said ring and said flexible wall, and a pressure actuatable member connected to said spacer for moving the same incrementally between said pivotal supports in accordance with the value of the pressure acting thereon, said pressure actuatable member being connected to the housing and responsive to the pressure therein, said pressure actuatable member, spacer and levers co-acting to so actuate said valve by flexing said flexible wall that the pressure in said housing is caused to vary as the square root of the difference between the pressures in the ring chambers and acting on said ring partition.

4. A device according to claim 3 characterized by the fact that the balancer housing has an inlet port and that the flexible wall thereof has an exhaust port therein and that the valve is within the housing and disposed to control said inlet and exhaust ports, both of said ports being closed by the valve when the force of pressure acting on the flexible wall balances the turning force exerted by the pressure difference acting on the partition of said ring, said inlet port being opened by movement of said ring when the pressure difference exceeds the force exerted by said flexible wall and said exhaust port being opened and the inlet port closed when the force on said flexible wall exceeds the force produced by said pressure difference, and that said device is provided with a viscous damper having a movable member connected to a moving part of said pressure actuated device and a stationary member secured against movement for damping out vibrations developed in said balancer.

ROBERT R. DONALDSON, Jr.

References Cited in the file of this patent

UNITED STATES PATENTS

| Number | Name | Date |
|---|---|---|
| 1,725,783 | De Florez | Aug. 27, 1929 |
| 1,992,343 | Ahustrom | Feb. 26, 1935 |
| 2,069,917 | Fischer | Feb. 9, 1937 |
| 2,257,577 | Rosenberger | Sept. 30, 1941 |
| 2,331,153 | Ackley | Oct. 5, 1943 |
| 2,451,425 | Allwein | Oct. 12, 1948 |